Patented June 18, 1940

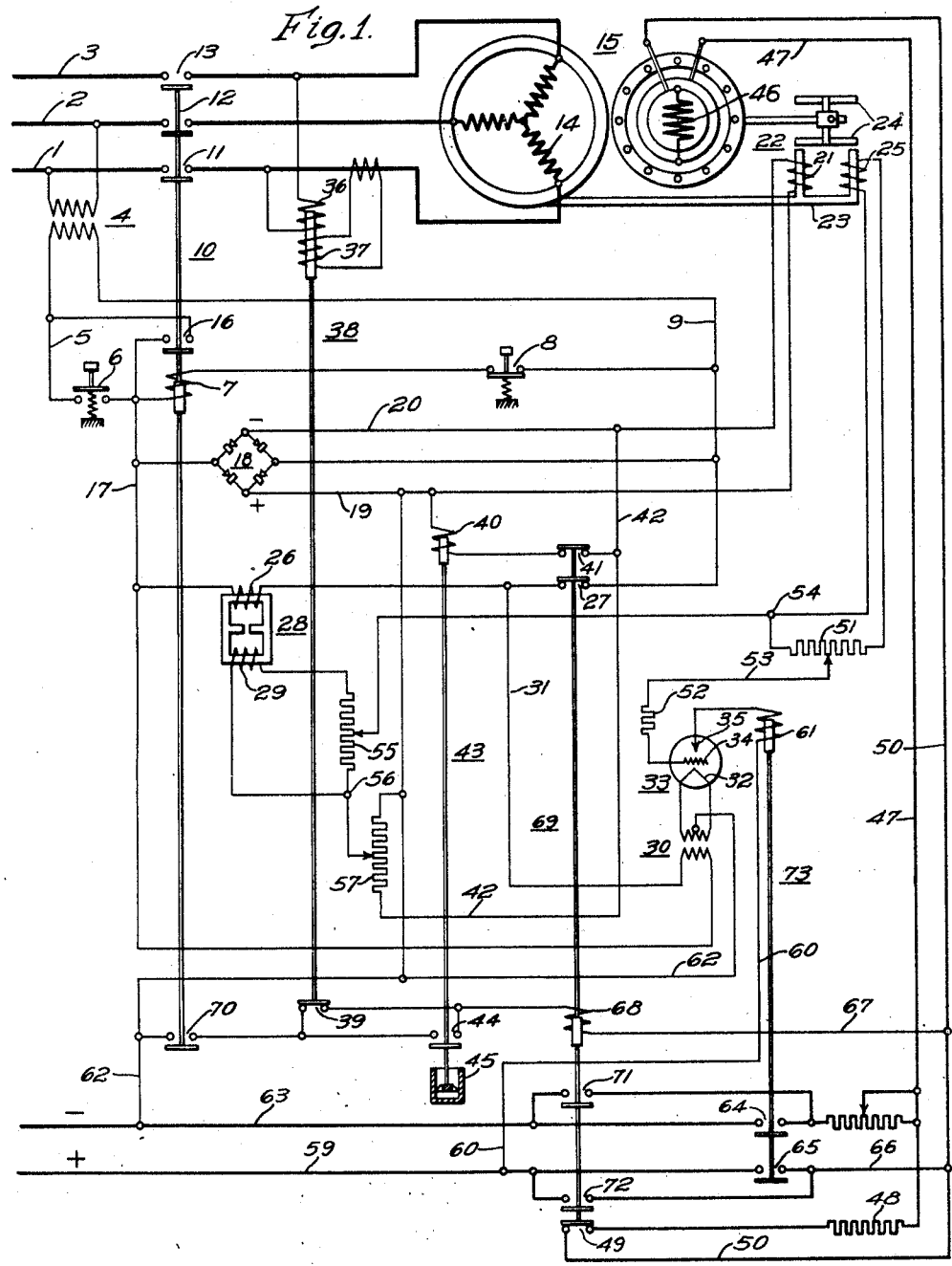

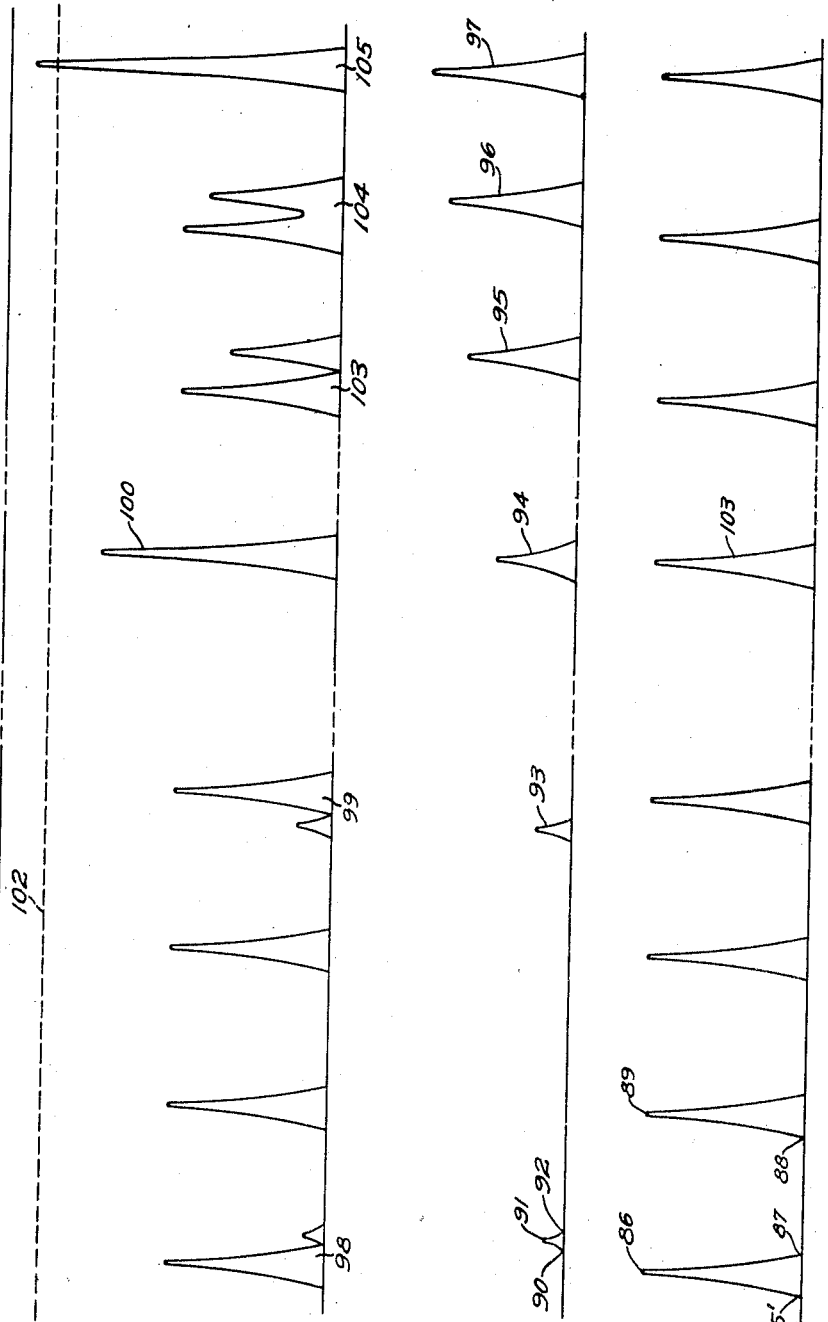

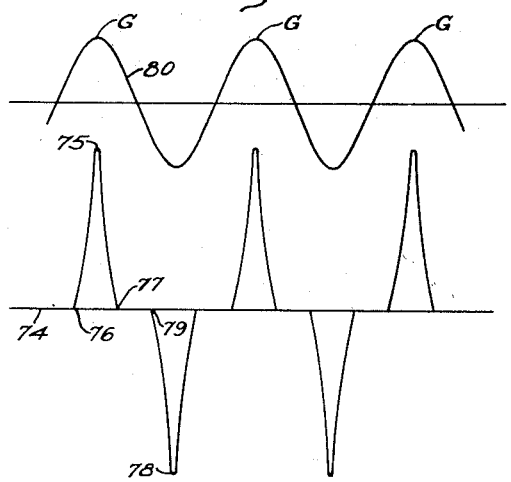
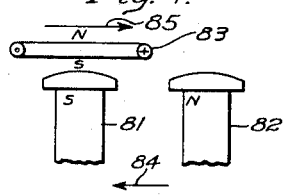
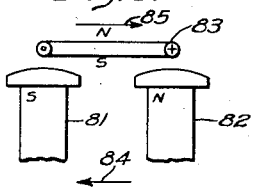
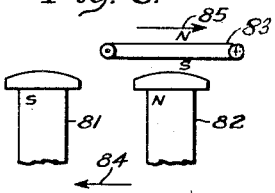
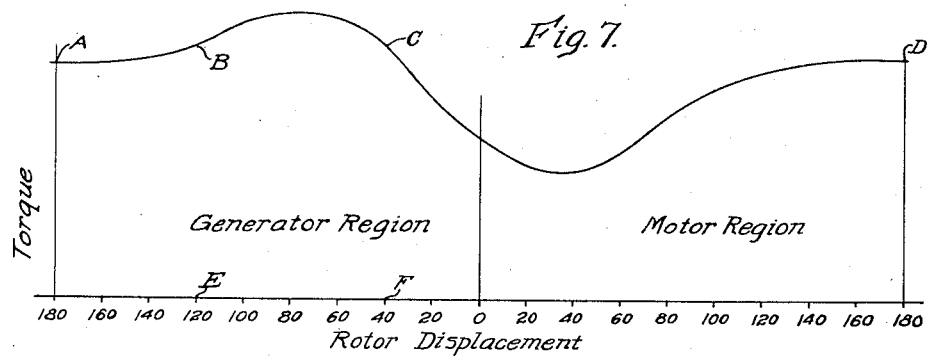

2,205,222

UNITED STATES PATENT OFFICE 2,205,222

STARTING CONTROL FOR SYNCHRONOUS MOTORS

Charles C. Shutt, East McKeesport, and John W. Dawson, Wilkinsburg, Pa., assignors to Westinghouse Electric & Manufacturing Company, East Pittsburgh, Pa., a corporation of Pennsylvania Application January 31, 1935, Serial No. 4,322
Renewed May 8, 1939

15 Claims. (Cl. 172—289)

Our invention relates to a system of control for electric motors and relates more particularly to a system of control for automatically starting synchronous motors.

It is well known and usual practice to start synchronous motors as induction motors and to transfer the motors from induction motor operation to synchronous motor operation, various automatic control systems being known to the trade and to those skilled in the art. With all of such automatic starting control systems no provision is made to eliminate the undesirable surges occasioned or produced in the supply circuit during such transfer from induction motor operation to synchronous motor operation. Furthermore, such transition from induction motor operation to synchronous motor operation not only produces surges in the supply system but also mechanical shocks to the motor, to the load coupled to the motor and to the generator of the supply system. A still more undesirable feature of operation of existing devices is that the motor may fail to synchronize because the pull-in torque that is developed by the motor when the excitation is applied at any particular instant may be less than the torque required by the load, with the result that the motor fails to synchronize even though the normal torque required by the load is less than the maximum torque against which the motor will synchronize if the proper instant is selected for the application of the excitation. When the field is excited the surges and shocks are repeated continually until the load is removed or synchronization takes place. It is thus apparent that under such starting conditions the motor could continue to drive the load if at the moment transfer is attempted its torque capacity could be increased sufficiently to effect synchronization.

It is well known to those versed in the art, that the maximum load which a given synchronous motor can accelerate from the balancing speed on its starting windings and synchronize varies with the relation in space of the rotor, or member which carries the field windings, with respect to the rotating vectors which represent the polyphase voltages impressed on the stator or armature windings, at the time of application of the direct current excitation voltage to the field windings.

One object of our invention, therefore, is to provide for properly controlling the time of application of the excitation voltage to the field windings of a synchronous motor.

Another object of our invention is to provide for selecting any pull-in torque between the minimum and the maximum of any given synchronous motor.

A more specific object of our invention is to control the time of energization of the field winding of a synchronous motor with reference to any given point on the alternating current voltage wave applied to the armature or stator of the motor.

Another object of our invention is to control the time of transfer of a synchronous motor from induction motor operation to synchronous motor operation so that the maximum load which the motor can accelerate consistently from the balancing speed on its starting windings and bring into synchronism is increased compared to the maximum load which the motor can accelerate consistently and synchronize without such control of the time of energization of the field winding.

A still further object of our invention is to minimize, or decrease, the transient pulsations of torque and current which always accompany, to a greater or less extent, the synchronizing of a synchronous motor.

Another object of our invention is to transfer a synchronous motor from induction motor operation to synchronous motor operation at such a time as to secure maximum pull-in torque.

A broad object of our invention is to control the transfer of a synchronous motor from induction motor operation to synchronous motor operation as a function of both the voltage and frequency of the currents induced in a winding on the pole pieces of a synchronous motor whereby the field winding may become fully excited at the proper time to secure any selected pull-in torque of the motor between its maximum and minimum.

Another object of our invention is to automatically control the time of transfer of a synchronous motor from induction motor operation to synchronous motor operation as a function of the instantaneous position of the rotor and the slip speed of the rotor so that the maximum load which the motor can accelerate consistently from the balancing speed on its starting windings and bring into synchronism is increased compared to the maximum load which the motor can accelerate consistently and synchronize without such control of the time of transfer or energization of the field winding.

A more specific object of our invention is to control the time of energization of the field winding of a synchronous motor with reference to any given point on a wave of alternating current supplied to the armature or stator of the motor as a function of slip frequency and instantaneous position of the rotor relative to the stator.

Other objects and advantages will become more apparent from a study of the following specification and the claims appended thereto when considered in conjunction with the accompanying drawings, in which:

Figure 1 is a diagrammatic showing of an automatic starting control for a synchronous motor embodying the novel features of our invention;

Fig. 2 shows a plurality of curves illustrating how the variations in frequency and voltage of an impulse generator shown in Fig. 1 are combined with the impulses of an impulse transformer, also shown in Fig. 1;

Fig. 3 shows wave diagrams of the source of energy and the characteristics of energy transmitted by a surge transformer constituting part of our invention;

Figs. 4, 5 and 6 illustrate diagrammatically sections of a stator core with reference to the poles of the field winding, and represent, respectively, the generator region, no-load position, and motor region; and Fig. 7 shows the variations of starting torque for different angular positions of the rotor with reference to the impressed voltage producing the rotating field in the armature of a synchronous motor.

Generally stated, our invention embodies features of control for effecting the complete synchronization of a synchronous motor, and the specific features thereof may be utilized with a time-limit starting control, a field frequency control, a speed-responsive control, or a scheme for automatically selecting both the speed or slip frequency and a definite relation of the rotor to the rotating field at the moment of transfer to thus obtain desired pull-in torque characteristics.

In this application we more specifically disclose and claim the starting control or scheme for selecting automatically both the speed and a definite relation of the rotor to the rotating field in the armature at the moment transfer from induction motor operation to synchronous motor operation is to be effected, to thus obtain desired pull-in characteristics for the motor.

The combination of speed, or slip frequency responsive starting control and "angle switching" control, is being disclosed and claimed in our copending application, filed January 31, 1935, Serial No. 4,323, and the time-limit starting control in combination with "angle switching" is being prosecuted in our copending application filed February 23, 1935, Serial No. 7,710.

If it be assumed, as shown in Fig. 1, that a scheme for measuring the speed of the motor and for measuring the rotor position relative to the rotating field in the armature is utilized, then means must be provided that are responsive to such joint measurements and that effect the energization of the field winding of the motor at such an instant that any desired pull-in torque characteristics are secured.

In the arrangement shown in Fig. 1, reference character 15 designates the synchronous motor, having armature winding 14 and field winding 46. The armature winding is adapted to be connected to buses 1, 2 and 3, energized with alternating current, by line contactor 10 having switching members 11, 12 and 13.

The field winding 46 of the motor, during induction motor operation, discharges through a discharge resistor 48 and the back contact members 49 of a main field switch 69. The initial energization of the field winding 46 with direct current from the source of direct current represented by the buses 59 and 63 is effected through a high speed field switch 73.

This high speed switch 73 is caused to operate by an electric discharge device 33. To obtain a proper time of breakdown of the discharge device 33, an impulse generator 22 and an impulse transformer 28 are interconnected with the discharge device. The impulse generator generates voltage impulses that vary in frequency and voltage with the speed of the motor, and by virtue of the positioning of its elements relative to the pole pieces, produces these impulses at a time when the rotor has some selected position with respect to the stator frame. The impulse transformer, on the other hand, produces its impulses at a time when the rotating field in the stator has some definite position. By a proper positioning of the para-magnetic bars 24 about the rotor shaft, as hereinafter described, assuming the magnetic member 23 is fixed with reference to the frame, any position of synchronism over the entire range of 360 electrical degrees may be selected for the impulses.

In Fig. 7, the variations in pull-in torque are shown for different rotor positions with reference to the rotating armature field, measured in electrical degrees. Zero represents the position of the rotor when the motor is in synchronism at no-load operation. The portion marked generator region corresponds to rotor positions in space ahead of the no-load synchronous position at any particular instant that may be considered, and in the direction of rotation. The portion designated motor region corresponds to rotor positions behind the no-load synchronous position at any particular instant that may be considered.

In addition the motor for the torque values included in the most favorable portion of the generator region, such as the ordinates of the section of the curve BC, will normally synchronize while the rotor moves in space through not more than one pole pitch. This is the ideal region for synchronizing because the pull-in torque is high and as a result the torque and current pulsations will be a minimum.

For other switching angles to the right of F and to the left of E, the torque values as given by the curve portions AB and CD represent load torques against which the motor will ultimately synchronize, but only after the rotor slips one or more poles. For torques less than those represented by the ordinates of the torque portions AB and CD, the number of poles which the rotor must slip decreases. In general, the motor will synchronize without slipping poles from any switching angle, even in the unfavorable regions, provided that the load torque is sufficiently reduced. By the use of our contribution to the art the field windings may be fully excited at any point between A and D but to secure the full advantages of such selective control, the field will be caused to become fully excited while the rotors are in the favorable region, namely the angles between F and E.

The curve shown in Fig. 7 was determined from test data of a typical synchronous motor. For a given voltage and frequency supplied to the motor, the curve will, of course, vary (1) with a change of the mechanical inertia of the moving elements, (2) a change in the excitation current of the field windings, (3) a change in the field winding circuit time constant, and (4) the sum of the time constants of the relays operated.

To amplify the explanation given in connection with Fig. 7, attention is called to Figs. 3, 4, 5 and 6. Let the upper portion of Fig. 3 represent the voltage impressed across the particular phase of the stator winding plotted against time. Let the check for rotor position, by the devices described more in detail hereinafter, be made at each of the points marked G. Let reference character 83 represent one of the coils in the phase across which the voltage shown in the upper portion of Fig. 3 is impressed. In Figs. 4, 5 and 6, sections of this coil are shown in the generator region, no-load position, and motor region, respectively.

Let the arrows designated by 85 represent the direction of rotation of the rotating field and let the polarities at the particular instant be as indicated adjacent the coil. Let the direction of slip be indicated by the arrows 84. Then if the poles 81 and 82 are energized with direct current and have the polarities shown, it will be apparent that the motor will fall into synchronism with a substantially maximum torque for the position shown in Fig. 4, which will be the most desirable operation. That is, in Fig. 4 the rotor is in the most favorable generator region.

In Fig. 5 the motor will be in no-load synchronous position and may, if the factors mentioned that influence synchronization are of the proper value, pull into synchronism without slipping poles. For the position shown in Fig. 6, the chances are against smooth synchronization. In accordance with our invention the field windings are caused to be fully excited when the rotor occupies the position shown in Fig. 4.

One of the essential features of our invention is, therefore, to determine the rotor position with reference to a given point, as G in Fig. 3, on the wave of alternating-current supplied to the stator. Our control system, after a suitable impulse has been received from the devices or that part of the system of control indicating a proper speed and rotor position relative to the rotating stator field, will apply the excitation voltage to the field windings at the first instant the relations of the rotor and rotating field are correct for maximum pull-in torque, or any other torque if another than maximum pull in torque is selected.

One set of means for determining the rotor position is shown at 22 in Fig. 1 and consists of one or a plurality of metal strips 24 of high permeability disposed axially of the rotor of the motor 1 and coupled to the rotor shaft to rotate with the rotor. This metal strip is located on the center line of one of the poles of the rotor, or any other position may be selected. When a plurality of strips are used there may be as many as one strip for every other pole around the rotor. The positions may not be on the center lines of the poles, but it is essential that the strips have some known positional relation to the pole pieces.

The strip or strips 24 pass under the poles of an electro-magnet 23 which has a winding 21 excited with direct current from a suitable source of direct current, as from the direct-current terminals of a full wave rectifier 18 adapted to be energized with alternating current from two of the main buses 1, 2 and 3 upon the closure of the line contactor 10.

As the strip or strips 24 pass the poles of the electro-magnet 23, bridging the poles, a voltage impulse is induced in the winding 25. This voltage impulse is impressed upon the resistor 51. These voltage impulses vary in frequency and magnitude as shown by the curve 90, 91, 92, 93, 94, etc., shown in Fig. 2. As the speed of the motor increases, the voltage value of each impulse increases and the impulses occur with greater and greater frequency. The impulses are thus a measure of the speed of the motor and also, by their time of occurrence indicate each time the rotor, or rather, the pole pieces, occupy a given position in space.

The current surges in the resistor 51 causes a variation of potential of the grid 34 with reference to the cathode 32 of the electronic device 33. The impulses produced by the coil 25, acting alone, are not of sufficient magnitude to make the electronic device conducting, that is, are not of sufficient effect to cause the electronic tube 33 to break down or discharge. Furthermore, no particular novel result would be secured if tube 33 should break down each time a voltage impulse were induced in coil 25, but the action of tube 33 would then only be to measure the slip frequency of the motor, or, what is more accurate, the impulses, and in consequence the break down of tube 33 would be a measure of the speed of the motor.

To properly control the time of energization of the field winding 46 from the direct-current buses 59 and 63 the breakdown of tube 33 is made a function of the combined action of the voltage impulse of coil 25 and the voltage impulse of an impulse transformer 28.

The impulse transformer 28 has a primary winding 26 which is connected to be energized with alternating current waves, as illustrated in the upper portion of Fig. 3. The magnetic circuit of the impulse transformer is so designed that the voltage impulses at the secondary winding 29 are, as to position and magnitude, somewhat as shown by the curve 74, 76, 75, 77, 79, 78, etc., in the lower portion of Fig. 3.

In Fig. 2, curve 101 represents the anode potential of tube 33, whereas the curve 102, shown in dotted line, shows the critical potential of the tube 33. When the tube 33 breaks down and passes current it causes the operation of the high-speed field switch 73.

In Fig. 2, curves 85', 86, 87, 88, 89 illustrate the voltage impulses produced by the impulse transformer 28, or at least those positive portions of the impulses that are of importance in causing the breakdown of the discharge device or tube 33. The curves 90, 91, 92, 93, etc., show how the impulses of electric energy produced by the impulse generator 22 vary in magnitude and frequency as the motor 15 accelerates. The impulses produced by the impulse generator are thus a measure of the speed of the motor, and their time of occurrence determines the position of the rotor with reference to a given selected point on the stator.

The magnitude of the impulses produced by the impulse transformer is such that the tube 33 will not break down, and the design of the impulse generator and the circuit arrangements for the grid 34 of the tube 33 are such that the magnitude of the impulses generated by the impulse generator, even when operating at synchronous speed, are not of sufficient magnitude to cause the breakdown of the tube 33, until the desired point is reached, as about to be described. At regions 98 and 99, the combined effect of the impulse transformer and the impulse generator on the grid bias is shown. At the region 100 coincident effect of the two impulses from the generator and transformer, respectively, is shown, but at the region 100 the speed of the motor is not yet of sufficient value to effect transfer of the motor from induction motor operation to synchronous motor operation. The design of the circuits for the grid of the tube 33 and the impulse generator 22 are such that breakdown of the tube is not caused before the motor has attained a selected speed such as 95%, 96% or 97% of synchronous speed.

When such a high speed is obtained, the variation of the grid bias is changed, as indicated at regions 103, 104 and 105. It will be noted that at 105, which is the first instance at which the impulses of the impulse generator and the impulse transformer are in synchronism and of sufficient magnitude to intersect the critical potential curve 102, the discharge device 33 will break down, thereby operating the high-speed field switch 73 to energize the field winding 46 with direct current.

A better understanding of our invention and the novel features thereof and objects thereof can probably be had from a study of a detailed description of the sequence of operation of our invention for a typical starting and operating cycle of a synchronous motor.

Assume that alternating-current buses 1, 2 and 3 are connected to energize the transformer 4 and thus the conductors 5 and 9, if the attendant wishes to start the synchronous motor 15, he depresses the starting push-button 6 to establish a circuit from the conductor 5 through the switch 6, actuating coil 7 of the line contactor 10, and stop switch 8 to the energized conductor 9. The operation of the line contactor 10 closes the switching members 11, 12 and 13, thereby energizing the armature 14 of the motor 15, and the motor will thus begin to operate as an induction motor and induce an alternating current in the circuit comprising field winding 46 and discharge resistor 48.

The line contactor 10 is provided with contact members 16 which establish a holding circuit for the actuating coil 7 of the line contactor 10, and also energize the conductor 17 independently of the actuation of the switch 6. Since conductor 17 is energized, the full-wave rectifier 18, being connected across conductors 17 and 9, will energize conductors 19 and 20 with direct current of the polarity indicated and thus energize the direct-current coil 21 of the magnetic circuit 23 of the impulse generator 22.

This impulse generator may have the magnetic member 23 disposed at any point on a circumference of the rotor shaft, and is influenced by the para-magnetic bars 24 adjustably mounted on the shaft of the rotor of the synchronous motor. It is not essential that the magnetic member 23 be fixed at any point, but it may also be made adjustable about the rotor shaft, but in such case, it may not be necessary to make the para-magnetic members adjustable with reference to the rotor shaft. Regardless of the relative position of the magnetic member 23 and the para-magnetic members 24 may have, the impulse generator 22 will, nevertheless, produce impulses of electrical energy in the coil 25, which will be a measure of the speed of the motor and also of the position of the rotor with reference to the stator.

The impulse transformer 28 is also energized from conductors 17 and 9 by a circuit through the primary winding 26, and the back contact members 27 of the main field switch 69. The secondary winding 29 of the impulse transformer 28 is connected across a resistor 55 to thus discharge through this resistor.

The instant the motor is started the transformer 30 is also energized from conductor 17 through the primary winding of the transformer 30 through conductor 31 to the right-hand terminal of the primary winding 26 and contact members 27 to the conductor 9. The cathode 32 of the electric discharge device 33 is energized by the transformer 30 and will become fully heated before this discharge device is called upon to become conducting, namely, to discharge.

The anode 35 receives its positive potential from the positively energized bus 59 through a circuit including the conductor 60 and actuating coil 61 of the high-speed field contactor 73. The control grid 34 is connected through resistor 52 and conductor 53 to a selected point on the resistor 51 acting as a discharge resistor for the coil 25 of the impulse generator 22. The grid 34 will, therefore, be influenced, by this potentiometer circuit, by the voltage impulses generated by the impulse generator 22.

The left-hand junction 54 of the resistor 51 is connected at a selected point on the resistor 55, and the junction 56 is connected at a selected point to the resistor 57. This resistor 57 is interconnected with the negative bus 63 of the direct-current buses 63 and 59 through conductor 62 and is interconnected to the negatively energized conductor 20 of the full-wave rectifier 18 by the conductor 42.

By the circuit arrangement described, it will be apparent that the bias of the grid 34 is a function of the impulses produced by the impulse transformer 28 and the impulses produced by the impulse generator 22.

A circuit is also established from the positively energized conductor 19 through the actuating coil 40 of the time limit relay 43, back contact members 41 of the main field switch 69, and conductor 42 to the negatively energized conductor 20. The time limit relay 43 has a negligible time constant when energized, thereby closing the contact members 44 almost immediately after the energization of the conductors 19 and 20.

During the induction motor operation, the power-factor relay 38 will have its coils 36 and 37 suitably energized to open the contact members 39, but the closure of the contact members 44 makes the operation of the main field contactor 69, which operation is explained more in detail hereinafter, independent of the power-factor relay 38 during starting operation of the motor.

During induction motor operation the field winding 46, operating as the secondary of a transformer, discharges through the discharge resistor 48 by a circuit from the right terminal of the field winding 46 through conductor 47, resistor 48, back contact members 49 of the main field contactor 69 and conductor 50 to the left terminal of the field winding 46.

When the motor has attained 95% of synchronous speed, or any other selected speed, as 96%, possibly even 97% of synchronous speed, the impulses in the coil 25 when acting in synchronism with the impulses produced by the impulse transformer 28 are of sufficient magnitude to cause the discharge device 33 to break down, thereby operating the high speed switch 73 and energizing the field winding 46 from the direct-current buses 59 and 63. The circuit for the actuating coil 61 of the high speed switch 73 may be traced from the bus 59 through conductor 60, actuating coil 61, electrodes 35 and 32 and conductor 62 to the negative bus 63.

Operation of the high speed field switch 73 closes the contact members 64 and 65, thereby establishing a circuit from the bus 59 through contact member 65, conductors 66, 50 and 67, actuating coil 68 of the main field contactor 69, contact members 44 and 70—which contact members 70 will, of course, have been closed upon the operation of the main line contactor 10—and conductor 62 to the negative bus 63.

Operation of the field contactor 69 closes the contact members 71 and 72, thereby energizing the field winding 46 independently of the high speed field switch 73 and also causing the opening of contact members 41 and 27. Opening of the contact members 27 disconnects the impulse transformer 28 from the conductors 17 and 9, thereby deenergizing the impulse transformer and also the tube 33.

The opening of contact members 41 deenergizes the actuating coil 40 of the time limit relay 43. The dashpot 45 gives this time-limit relay a time constant of sufficient length to insure that the synchronous motor pulls into synchronism to cause the power factor to become the normal power factor corresponding to full or partial load, under which condition the relay is ineffective. The power factor relay 38, therefore, closes the contact members 39 before the contact members 44 open.

This latter arrangement is of particular utility for resynchronization during pull-out of the synchronous motor. When the synchronous motor pulls out of step, the power-factor relay 38 opens the contact members 39, which deenergizes the actuating coil 68 of the main field switch 69, which thereupon establishes the necessary circuit to resynchronize the motor in exactly the manner hereinbefore explained in connection with the initial synchronization of the motor.

We are, of course, aware that others skilled in the art, particularly after having had the benefit of the teachings of our invention, may devise other circuit diagrams for accomplishing the novel results hereinbefore specified and recited in the appended claims, but we wish to be limited only by the pertinent prior art and the scope of the appended claims.

We claim as our invention:

1. In a system of control for starting a synchronous motor, in combination, a synchronous motor having an armature winding, a field winding, and a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, adapted to cause the operation of said switching means at a selected instant, said control means including an impulse generator operated by the rotor of the motor and adapted to generate impulses of electric energy the magnitude of which is determined by the speed of the motor and the position of which, with reference to time, is determined by the position of the rotor in space, means responsive to the position of the rotating field in the armature winding, and electronic means responsive to the joint effect of said two last-named means.

2. In a system of control for starting a synchronous motor, in combination, a synchronous motor having an armature winding, a field winding, and a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, said control means including impulse means interconnected with said source of alternating current and adapted to produce impulses of electric energy each time the rotating field in the armature winding takes some selected position, an impulse generator, driven by the rotor of the motor, adapted to generate impulses of electric energy each time the rotor of the motor takes a selected position, and electric discharge means, responsive to the magnitude of the combined impulse of the impulses of energy produced by said impulse means and impulse generator, adapted to cause the operation of said switching means.

3. In a system of control for starting a synchronous motor, in combination, a synchronous motor having an armature winding, a field winding, and a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means including an impulse transformer and electronic means connected to said source of alternating current and adapted to produce impulses of alternating current energy each time a certain phase of the rotating field in the armature takes a given position in the armature of the motor, an impulse generator coupled to the motor and adapted to generate an impulse of electric energy determined in magnitude by the speed of the motor and in position with reference to time by the position of the rotor in space, an electric discharge device designed to break down the first instant the magnitude of the combined impulses of the impulse generator and the impulse transformer attains a certain value, and means responsive to the breakdown of the electric discharge device adapted to cause the operation of said switching means.

4. In a system of control for starting a synchronous motor, in combination, a switch, an electric discharge device having a control grid and principal electrodes adapted to operate said switch when a discharge is produced in said device, means for producing a change of grid bias as a function of motor speed and rotor position, and means for also producing a change in grid bias as a function of the position of the rotating field in the motor, said discharge device being designed to break down when the combined effect of said grid biasing means is of a given magnitude.

5. In a starting control system for a synchronous motor, in combination, a synchronous motor having an armature winding and a field winding, a source of alternating current, means adapted to connect said armature winding to said source of alternating current, a source of direct current, a high-speed switch adapted to connect said field winding to said source of direct current, a main field switch energized by said high-speed switch adapted to connect said field winding to the source of direct current through the main field switch independent of said high-speed switch, and an electric discharge device, influenced by the speed of the motor and the relative position of the rotating armature field and the field winding, adapted to initiate the operation of said high-speed relay.

6. In a starting control system for synchronous motors, in combination, a synchronous motor having an armature winding and a field winding, a source of alternating current, means adapted to connect said armature winding to said source of alternating current, a source of direct current, a high-speed switch adapted to connect said field winding to said source of direct current, a main field switch energized by said high-speed switch adapted to connect said field winding to the source of direct current through the main field switch independent of said high-speed switch, an electric discharge device having an anode, a cathode and a control grid, an impulse generator driven by the synchronous motor and adapted to generate impulses of electric energy, the magnitude and frequency of which is determined by the speed of the motor and the time of occurrence is determined by the position of the field winding of the motor, means for producing impulses of energy each time the rotating field in the armature winding is in a given position, and circuit connections for inter-connecting the control grid with the last-named means and the impulse generator, whereby the discharge device is caused to break down the first time the impulses of energy are in substantial synchronism and of predetermined combined magnitude.

7. In a starting control system for synchronous motors, in combination, a synchronous motor having an armature winding and a field winding, a source of alternating current, means adapted to connect said armature winding to said source of alternating current, a source of direct current, a high-speed switch adapted to connect said field winding to said source of direct current, a main field switch energized by said high-speed switch adapted to connect said field winding to the source of direct current through the main field switch independent of said high-speed switch, an electric discharge device having two controlled terminals, namely, a cathode and an anode, and a control grid, means adapted to vary the bias of the grid relative to one of the controlled terminals, as a function of the speed of the motor and the position of the field winding, and means for also varying the bias of the grid as a function of the position of the rotating field in the armature winding.

8. A starting control system for synchronous motors, in combination, a synchronous motor having an armature winding and a field winding, a source of alternating current, means adapted to connect said armature winding to said source of alternating current, a source of direct current, a high-speed switch adapted to connect said field winding to said source of direct current, a main field switch energized by said high-speed switch adapted to connect said field winding to the source of direct current through the main field switch independent of said high-speed switch, an electric discharge device having a pair of principal electrodes and a control grid, an impulse transformer connected to the source of alternating current and adapted to produce an impulse of electric energy each time the rotating field in the armature occupies a given position, an impulse generator adapted to produce an impulse of energy each time the field winding occupies a given position, circuit connections for energizing said control grid with said impulses of energy, and means associated with said grid to select one certain relation of said impulses to effect the discharge of said discharge device.

9. In a system of control for starting a synchronous motor, in combination, a synchronous motor having an armature winding, a field winding, and a damper winding constituting a starting means to start the motor as an induction motor upon energization of the armature by an alternating current, a source of alternating current, means for connecting the armature winding to the source of alternating current, a source of direct current, high-speed switching means adapted to connect the field winding to the source of direct current in a relatively short interval of time after the energization of this said switching means, high-speed control means adapted to cause the operation of said high-speed switching means, said control means including electronic means responsive jointly to the speed of the motor and the position of the field winding with reference to the rotating field in the armature, and means operable after the synchronization of the motor for deenergizing said high-speed control means.

10. In a system of control for starting a synchronous motor, in combination, a synchronous motor having an armature winding, a field winding, and a damper winding constituting a starting means to start the motor as an induction motor upon energization of the armature by an alternating current, a source of alternating current, means for connecting the armature winding to the source of alternating current, a source of direct current, high-speed switching means for connecting the field winding to the source of direct current, in an interval of time, which is practically negligible, after the energization of said high-speed switching means, high-speed control means, adapted to cause the operation of said high-speed switching means, said control means including electronic means, means responsive to both the speed of the rotor and the position of the rotor in space and means responsive to the position of the rotating field in the stator, both said last-named means controlling said electronic means, and means operable after the synchronization of the synchronous motor adapted to deenergize said high-speed switching means and said high-speed control means.

11. In a system of control for starting a synchronous motor, in combination, a synchronous motor having an armature winding, a field winding, and a damper winding constituting a starting means to start the motor as an induction motor upon energization of the armature by an alternating current, a source of alternating current, means for connecting the armature winding to the source of alternating current, a source of direct current, high-speed switching means adapted to connect the field winding to the source of direct current within a substantially negligible interval of time after the energization of said high-speed switching means, high-speed control means, adapted to cause the operation of said high-speed switching means at a selected instant, said control means including an impulse generator operated by the rotor of the motor and adapted to generate impulses of electric energy the magnitude of which is determined by the speed of the motor and the position thereof, with reference to time, is determined by the position of the rotor in space, means responsive to the position of the rotating field in the armature winding and electronic means responsive to the joint effect of said two last-named means, and means operable after the synchronization of said motor adapted to deenergize said high-speed switching means and said electronic means.

12. In a system of control for starting a synchronous motor, in combination, a synchronous motor having an armature winding, a field winding, and a damper winding constituting a starting means to start the motor as an induction motor upon the energization of the armature by an alternating current, a source of alternating current, means for connecting the armature winding to the source of alternating current, a source of direct current, high-speed switching means adapted to connect the field winding to the source of direct current within a substantially negligible interval of time after the energization of said high-speed switching means, control means, said control means including: an electric impulse producing means interconnected with said source of alternating current adapted to produce impulses of electric energy each time the rotating field in the armature winding has some selected position; an impulse generator, driven by the rotor of the motor, adapted to generate impulses of electric energy each time the rotor of the motor takes a selected position with reference to the stator; and means, responsive to the magnitude of the combined electrical impulses of the electric impulse producing means and said impulse generator, adapted to cause the operation of said high-speed switching means, and means operable after the synchronization of the motor adapted to deenergize said high-speed switching means and said control means.

13. In a system of control for starting a synchronous motor, in combination, a synchronous motor having an armature winding, a field winding, and a damper winding constituting a starting means to start the motor as an induction motor upon energization of the armature by an alternating electric current, a source of alternating current, means for connecting the armature winding to the source of alternating current, a source of direct current, high-speed switching means adapted to connect the field winding to the source of direct current in a short interval of time, that is practically negligible in practice, after the energization of said high-speed switching means, and control means, said control means including: electric impulse producing means interconnected with said source of alternating current adapted to produce impulses of electrical energy each time the rotating field in the armature winding has some selected position with reference to the frame of the stator; an impulse generator, driven by the rotor of the motor, adapted to generate impulses of electrical energy each time the rotor of the motor has a selected position with reference to the frame of the motor; and electric discharge means, responsive to the magnitude of the combined impulse of the impulses of energy produced by said electrical impulse producing means and said impulse generator adapted to cause the operation of said high-speed switching means.

14. In a system of control for starting a synchronous motor, in combination, a synchronous motor having an armature winding, a field winding, and a damper winding constituting a starting means to start the motor as an induction motor upon energization of the armature by an alternating current, a source of alternating current, means adapted to connect the armature winding to the source of alternating current, a source of direct current, high-speed switching means adapted to connect the field winding to the source of direct current in a relatively short interval of time, that is negligible in practice, after the energization of said high-speed switching means, high-speed control means including: an impulse transformer; electronic means connected to said source of alternating current adapted to produce impulses of alternating current energy each time a certain phase of the rotating field in the armature has a given position with reference to the frame of the motor; an impulse generator coupled to the rotor adapted to generate an impulse of electrical energy determined in magnitude by the speed of the motor and in position with reference to time by the position of the rotor in space; an electric discharge device designed to break down the first instant the magnitude of the combined impulses of the impulse generator and the impulse transformer attains a certain value; and means responsive to the breakdown of the electric discharge device adapted to cause the operation of said high-speed switching means, and means operable after the synchronization of said motor, adapted to deenergize said high-speed switching means and said high-speed control means.

15. In a system of control for starting a synchronous motor, in combination, a high-speed switch, an electric discharge device having a control grid and principal electrodes adapted to operate said high-speed switch when a discharge is produced in said discharge device, means for producing a change of grid bias as a function of motor speed and rotor position, means for also producing a change in grid bias as a function of the position of the rotating field in the motor with reference to the frame of the motor, said discharge device being designed to break down only when the combined effect of said grid biasing means is of a given magnitude, and means operable after the synchronization of said motor adapted to deenergize said high-speed switch and said electric discharge device.

CHARLES C. SHUTT.
JOHN W. DAWSON.